(12) United States Patent
Yuyama

(10) Patent No.: US 7,397,611 B2
(45) Date of Patent: Jul. 8, 2008

(54) IMAGE CAPTURING APPARATUS, IMAGE COMPOSING METHOD AND STORAGE MEDIUM

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/704,041

(22) Filed: Feb. 8, 2007

(65) Prior Publication Data

US 2007/0188652 A1 Aug. 16, 2007

(30) Foreign Application Priority Data

Feb. 13, 2006 (JP) ............................. 2006-035079

(51) Int. Cl.
*G02B 15/14* (2006.01)
*G02B 7/02* (2006.01)

(52) U.S. Cl. ........................ 359/694; 359/704; 359/823

(58) Field of Classification Search ......... 359/694–704, 359/819–824; 396/96, 101, 106–120; 348/345–350
See application file for complete search history.

(56) References Cited

U.S. PATENT DOCUMENTS 6,738,197 B2 * 5/2004 Fujii .......................... 359/698
7,330,317 B2 * 2/2008 Onishi et al. ................. 359/697

FOREIGN PATENT DOCUMENTS

JP 2003-319235 A 11/2003

* cited by examiner

*Primary Examiner*—Mohammed Hasan
(74) *Attorney, Agent, or Firm*—Frishauf, Holtz, Goodman & Chick, P.C.

(57) ABSTRACT

In a digital camera 1, when the halfway depression operation of the shutter button is detected, the lens position which is in focus for each capture area is detected and stored. On the other hand, when instruction to record is detected, intensity of light is sequentially read out at the stored lens position from the capture area associated with the lens position and the image data is generated. Accordingly, it is possible to acquire image data which is in focus on all objects that have been imaged by the CMOS sensor 4.

20 Claims, 6 Drawing Sheets

| CAPTURE AREA | SN |
|---|---|
| 41 | No. 4 |
| 42 | No. 4 |
| 43 | No. 10 |
| 44 | No. 4 |
| 45 | No. 4 |
| 46 | No. 10 |
| 47 | No. 4 |
| 48 | No. 4 |
| 49 | No. 2 |

IMAGE CAPTURING APPARATUS, IMAGE COMPOSING METHOD AND STORAGE MEDIUM

BACKGROUND OF THE INVENTION

1. Field of the Invention

The present invention relates to an image capturing apparatus, an image composing method and a storage medium.

2. Description of the Related Art

Conventionally, in an image capturing apparatus such as a digital camera, the lens position is aligned so that the object is in focus, that is, the auto focus process is performed. In such a case, an AF evaluation value is calculated at each lens position for the sensing area in which an image of an object is formed out of the entire sensing area. Then, the lens is moved to the position where the AF evaluation value is the highest.

In addition, as disclosed in Japanese Laid-Open (Kokai) Patent Publication No. 2003-319235, there is also a technology for repetitively acquiring image data by performing the auto focus process for each sensing area, and composing the image data that have been thus acquired. As a result of this, the image data based on the entire capture area is finally acquired.

SUMMARY OF THE INVENTION

It is an object of the present invention to provide an image capturing apparatus, an image composing method and storage medium capable of acquiring composite image data at a higher speed by composing the image data that are in focus in individual capture areas.

In accordance with an aspect of the present invention, there is provided a image capturing apparatus according to the present invention comprises: an image capturing apparatus comprising: an image capturing unit; a lens; a moving unit which moves the lens; a focusing unit which divides a capture field of the image capturing unit into a plurality of areas, controls the moving unit so that the moving unit moves the lens, and focuses on an object included in each of the plurality of areas; a control unit which performs control so as to associate the plurality of lens positions of the lens focused on by the focusing unit with the plurality of areas including the objects which are focused on at the plurality of lens positions; a first image data acquisition unit which controls the moving unit so that the moving unit moves the lens to the plurality of lens positions that have been associated by the control unit, and acquires image data in the plurality of areas that have been associated with the lens positions of the lens moved by the moving unit, and a generation unit which composes a plurality of image data acquired by the image data acquisition unit and generates image data corresponding to the capture field.

In accordance with another aspect of the present invention, there is provided an image composing method of an electronic apparatus including an image capturing unit, a lens and a moving unit which moves the lens; the method comprising: a focusing step for dividing a capture field of the image capturing unit into a plurality of areas, controlling the moving unit so that the moving unit moves the lens, and focusing on an object included in each of the plurality of areas; a control step for performing control so as to associate the plurality of lens positions of the lens with the plurality of areas including the objects which are focused on at the plurality of lens positions; an image data acquisition step for controlling the moving unit so that the moving unit moves the lens to the plurality of lens positions that have been associated by the control step, and acquiring image data in the plurality of areas that have been associated with the lens positions of the lens moved by the moving unit, and a generation step for composing a plurality of image data acquired by the image data acquisition step and generating image data corresponding to the capture field.

In accordance with another aspect of the present invention, there is provided a computer program product for an image capturing program stored on a computer-readable medium and executed by a computer, comprising the steps of: a focusing step for dividing a capture field of the image capturing unit into a plurality of areas, controlling the moving unit so that the moving unit moves the lens, and focusing on an object included in each of the plurality of areas; a control step for performing control so as to associate the plurality of lens positions of the lens with the plurality of areas including the objects which are focused on at the plurality of lens positions; an image data acquisition step for controlling the moving unit so that the moving unit moves the lens to the plurality of lens positions that have been associated by the control step, and acquiring image data in the plurality of areas that have been associated with the lens positions of the lens moved by the moving unit, and a generation step for composing a plurality of image data acquired by the image data acquisition step and generating image data corresponding to the capture field.

In accordance with another aspect of the present invention, there is provided an image capturing apparatus comprising: image capturing means; lens; moving means for moving the lens; focusing means for dividing a capture field of the image capturing means into a plurality of areas, controlling the moving means so that the moving means moves the lens means, and focusing on an object included in each of the plurality of areas; control means for performing control so as to associate the plurality of lens positions of the lens focused on by the focusing means with the plurality of areas including the objects which are focused on at the plurality of lens positions; a first image data acquisition means which controls the moving means so that the moving means moves the lens to the plurality of lens positions that have been associated by the control means, and acquires image data in the plurality of areas that have been associated with the lens positions of the lens moved by the moving means, and generating means for composing a plurality of image data acquired by the image data acquisition unit and generating image data corresponding to the capture field.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 shows the state of a lens position storage area 121 of a memory 12;

DETAILED DESCRIPTION OF THE PREFERRED EMBODIMENTS

The present invention will hereinafter be described in detail with reference to the preferred embodiments shown in the accompanying drawings as an example of application of the image capturing apparatus of the present invention to a digital camera.

A. First Embodiment

A-1. Configuration of the Digital Camera

Figure 1:
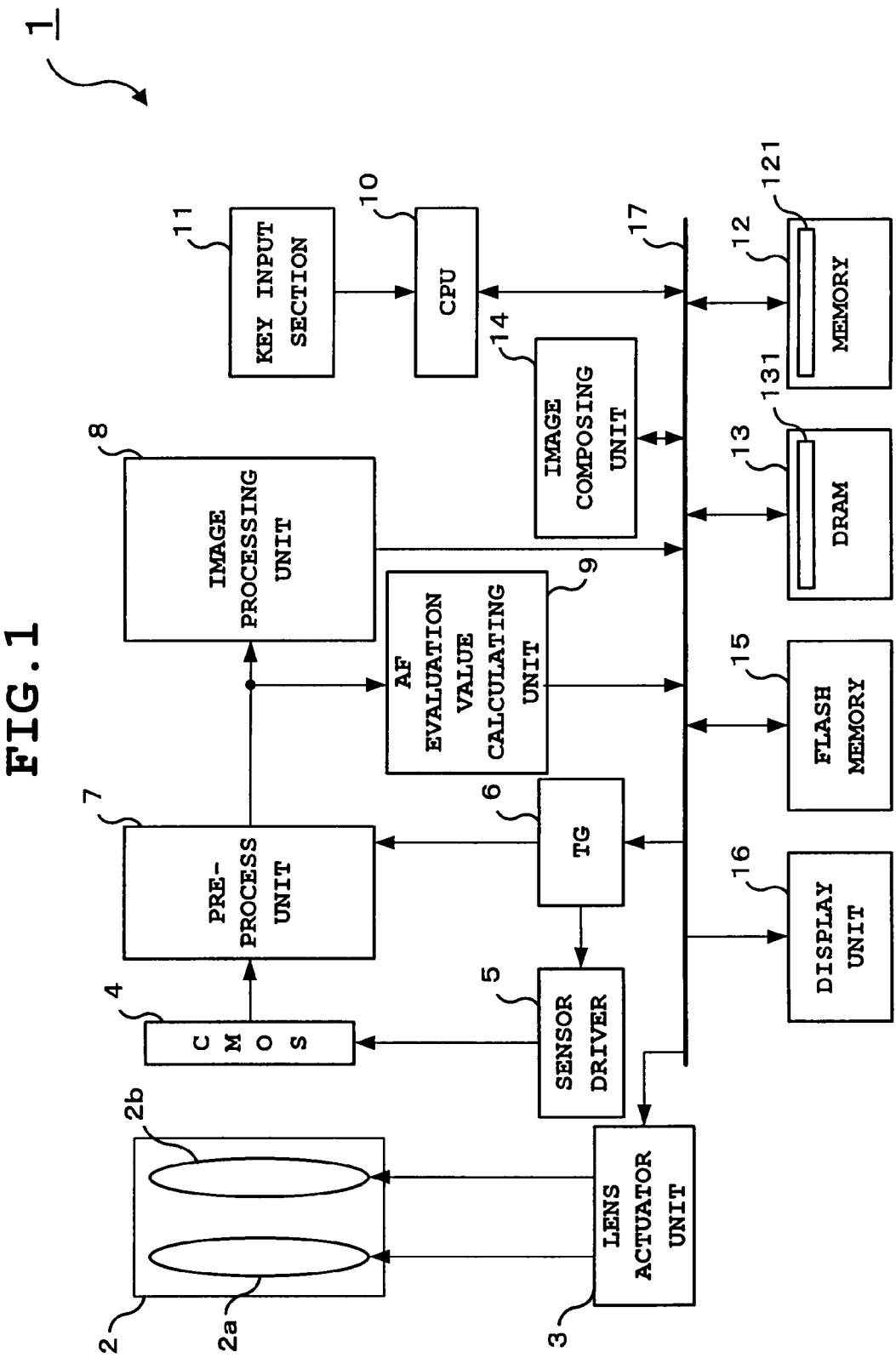
FIG. 1 is a block diagram of a digital camera according to an embodiment of the present invention.

FIG. 1 is a block diagram of an electrical schematic of a digital camera 1 that actualizes an image capturing apparatus of the present invention.

The digital camera 1 includes a lens unit 2, a lens actuator unit 3, a Complementary Metal Oxide Semiconductor (CMOS) sensor 4, a sensor driver 5, a timing generator (TG) 6, a pre-process unit 7, an image processing unit 8, an AF evaluation value calculating unit 9, a central processing unit (CPU) 10, a key input section 11, a memory 12, a dynamic random access memory (DRAM) 13, an image composing unit 14, a flash memory 15, a display unit 16, and a bus 17.

The lens unit 2 includes a focus lens unit 2a consisting of a plurality of lens groups, a zoom lens unit 2b and the like, and the lens unit 2 is connected to the lens actuator unit 3. The lens actuator unit 3 includes a focus motor, a zoom motor, a focus motor driver, and a zoom motor driver (not shown). The focus motor and the zoom motor respectively drive the focus lens unit 2a and the focus lens unit 2b in an optical axis direction. The focus motor driver and the zoom motor driver respectively drive the focus motor and the zoom motor in adherence to a control signal sent from the CPU 10.

The CMOS sensor 4 is driven by the sensor driver 5 and photo-electrically converts the light intensity of the respective colors in the RGB value of a capture field on which an image is formed at a constant cycle and outputs the light intensity to the pre-process unit 7. The CPU 10 controls the operation timings of the sensor driver 5 and the pre-process unit 7, via the TG 6.

The TG 6 is connected to the pre-process unit 7. The pre-process unit 7 includes a Correlated Double Sampling (CDS) circuit, an Automatic Gain Control (AGC) circuit, and an analog-to-digital (A/D) converter. The CDS circuit performs correlated double sampling on the imaging signal outputted from the CMOS sensor 4 and holds the sampled imaging signal. The AGC circuit performs automatic gain control on the sampled imaging signal. The A/D converter converts the automatic-gain-controlled analog imaging signal to a digital signal. The intensity of light outputted from the CMOS sensor 4 is converted into a digital signal through processing by the pre-process unit 7, and, is sent to the image processing unit 8 and the AF evaluation value calculating unit 9.

The image processing unit 8 performs gamma (γ) correction processing, white balance processing or the like to the digital signal which has been sent from the pre-process unit, 7, and also generates luminance and chrominance signals (YUV data: a luminance (Y) signal and a chrominance (UV) signal). The generated luminance and chrominance signals are sent to the CPU 10 as image data.

During an auto focus process, the AF evaluation value calculating unit 9 extracts a high-frequency component from individual image data in the individual divided capture areas at individual lens positions of individual focus lens units 2a, and multiplies the extracted high-frequency components to calculate an AF evaluation value.

The CPU 10 has functions of performing compression and expansion processes (compression and expansion in a joint photographic experts group (JPEG) format or a moving picture experts group (MPEG) format, etc.), an auto focus control process, and an imaging process in general. The CPU 10 also controls each section of the digital camera 1.

The key input section 11 includes a plurality of operation keys, such as a shutter button, a mode selection key, a menu key, a control key, a SET key and a zoom key. The key input section 11 outputs operation signals to the CPU 10 depending on the key operations performed by the user.

The shutter button has a mechanism that can identify a halfway depression operation of the shutter button and an instruction to record performed by the user.

The memory 12 stores a necessary control program (control programs necessary for the auto focus process, image capturing process or the like) so that the CPU 10 controls each section of the digital camera 1. The CPU 10 operates by loading and executing the program. In addition, the memory 12 includes a lens position storage area 121 described below.

The DRAM 13 is used as a buffer memory temporarily storing the image data sent to the CPU 10 through the CMOS sensor 4, the pre-process unit 7, and the image processing unit 8. The DRAM 13 is also used as a working memory of the individual programs executed by the CPU 10. In addition, the DRAM 13 develops a work area 131 during the auto focus process described below.

The image composing unit 14 compounds image data for each of the capture areas stored in the buffer memory (DRAM 13) for generating a single image data.

The flash memory 15 is a recording medium used to record the compressed image data.

The display unit 16 includes a color liquid crystal display (LCD) and a driver. In the recording mode, the display unit 16 sequentially displays an image based on image data (an RGB signal) imaged by the CMOS sensor 4. In the playback mode, the display unit 16 reads out the image data which has been recorded and compressed during the recording mode and then stored in the flash memory 15, and expands and displays the image data.

A-2. Functions of Individual Configurations of the Digital Camera 1 Featuring the Present Invention Functions of individual configurations of the digital camera 1 will be described for the period of the auto focus process and the period of the recording process, separately.

A-2-1. During the Auto Focus Process

In the auto focus process, the entire capture area of the CMOS sensor 4 is treated as a plurality of divided capture areas. An AF evaluation value for each capture area is calculated based on the image data acquired by forming an image on the entire capture area, and the lens position of the focus lens unit 2a is stored based on the calculated AF evaluation value.

Figure 2A:
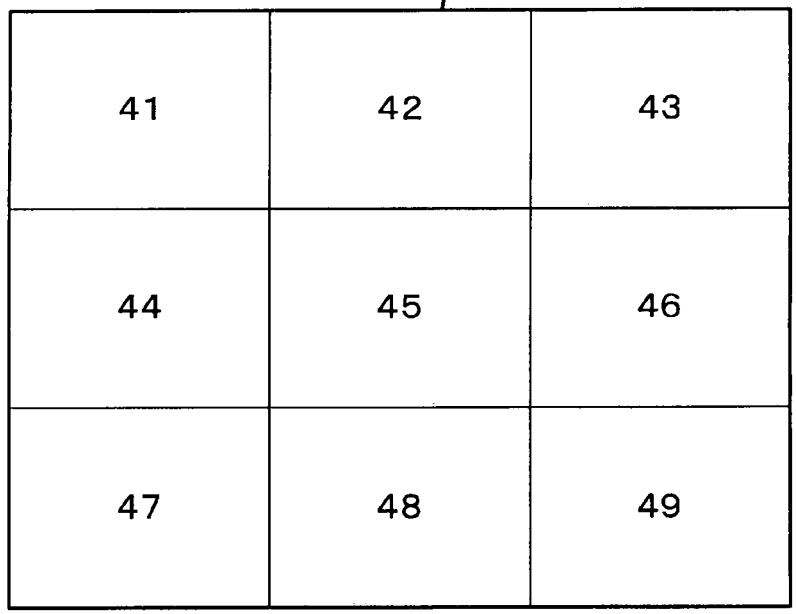
FIG. 2A shows a state of a plurality of divided capture areas that have been divided by a CMOS sensor 4.
Figure 2B:
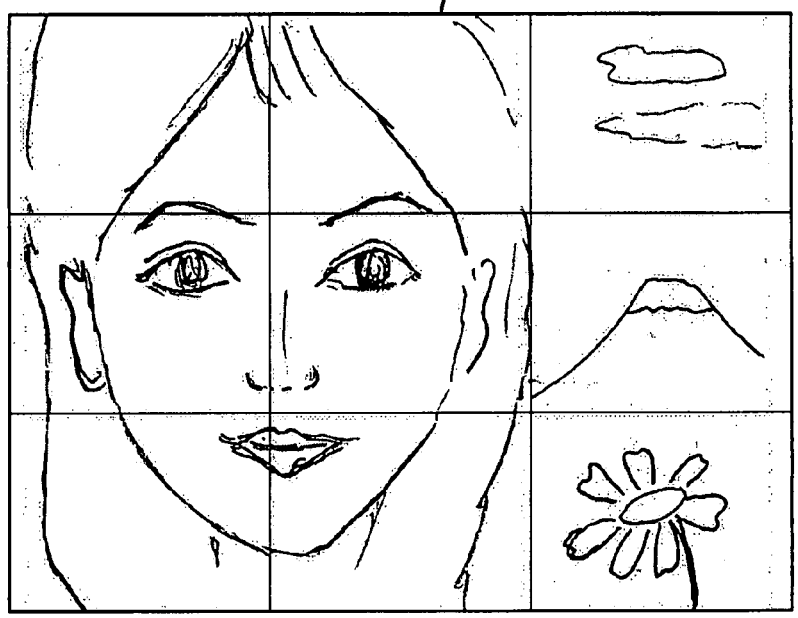
FIG. 2B shows an example of a state of image data formed by the CMOS sensor 4.

FIG. 2A shows the states of a plurality of capture areas 41 to 49 of the CMOS sensor 4, and FIG. 2B shows an example of the image data acquired based on intensity of light which forms an image on the entire capture area of the CMOS sensor 4.

Referring to FIG. 2B, the entire capture area of the CMOS sensor 4 is divided into 9 capture areas 41 to 49 identifiably based on the address (positional information) of the capture area. In addition, the image data which is acquired as a result of forming an image on the entire capture area of the CMOS sensor 4 is also identifiably distributed into the plurality of the divided capture areas 41 to 49.

The process will be specifically described as below.

In the recording mode, the CPU 10 starts the auto focus process when instruction to start the auto focus process has been given, for example, by detection of the halfway depression operation of the shutter button by the user.

Specifically, when the CPU 10 sends a predetermined control signal to the lens actuator unit 3, the lens actuator unit 3 moves a lens position of the focus lens unit 2a from the telephoto end to the wide-angle end at a predetermined interval. In addition, the predetermined control signal is also sent to the sensor driver 5. The sensor driver 5 which received the control signal outputs intensity of light which forms an image on the entire capture area of the CMOS sensor 4 to the pre-process unit 7, every time the focus lens unit 2a is moved to a preset lens position.

On the other hand, the pre-process unit 7 and the image processing unit 8 perform the above-described processes to intensity of light which has been inputted and generate the image data. At this time, the image processing section 8 divides the generated image data based on the positions of the plurality of divided capture areas 41 to 49, and sequentially sends the divided image data to the AF evaluation value calculating unit 9.

The AF evaluation value calculating unit 9 reads out the image data acquired at each lens position for the capture areas 41 to 49, and calculates the AF evaluation value for the capture areas 41 to 49 based on the image data.

The CPU 10 acquires the lens position of the focus lens unit 2a where the AF evaluation value becomes the maximum evaluation value for each of the capture areas 41 to 49 based on the calculated AF evaluation values of the capture areas 41 to 49.

The purpose of the auto focus process is not to record image data of high image quality, but to detect the lens position where the AF evaluation value becomes the maximum evaluation value. Therefore, the CPU 10 controls the sensor driver 5 so that the sensor driver 5 reads out intensity of light of the capture field on which an image is formed by the CMOS sensor 4 while thinning it out at a constant interval.

Accordingly, even if the number of the pixels of the CMOS sensor 4 increases, the time required for the auto focus process can be reduced.

During the auto focus process, at first, the CPU 10 develops the work area 131 in the predetermined storage area of the DRAM 13. When the CPU 10 detects the lens position where the AF evaluation value becomes the maximum evaluation value of imaging, the CPU 10 stores the lens position for each of the capture areas 41 to 49 in the work area 131.

Note that, during the auto focus process, there is no need for storing the AF evaluation value again for the capture area in which the lens position where the AF evaluation value becomes the maximum evaluation value that has been stored among the entire capture area of the CMOS sensor 4. Therefore, the CPU 10 controls the sensor driver 5 so that the sensor driver 5 will not read out the capture field for the capture area.

Figure 3A:
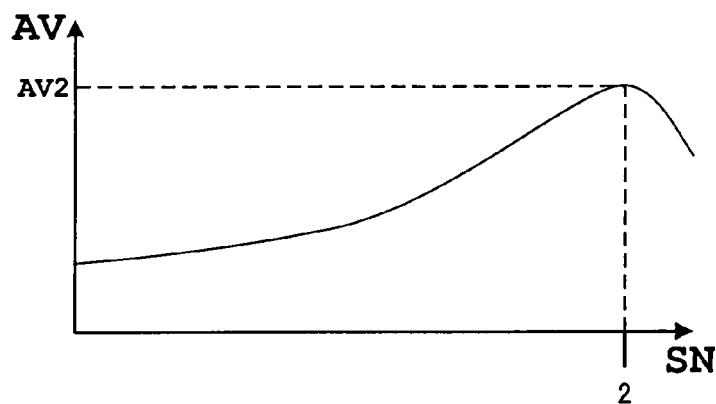
FIG. 3A is a chart showing the relation between an AF evaluation value and a lens position for a capture area 49.
Figure 3B:
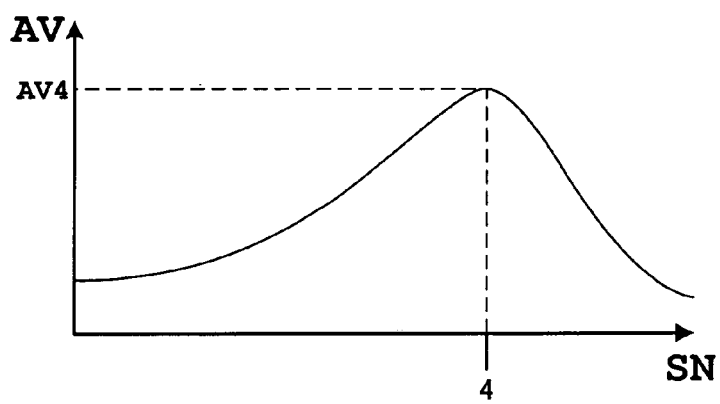
FIG. 3B is a chart showing the relation between an AF evaluation value and a lens position for capture areas 41, 42, 44, 45, 47 and 48.
Figure 3C:
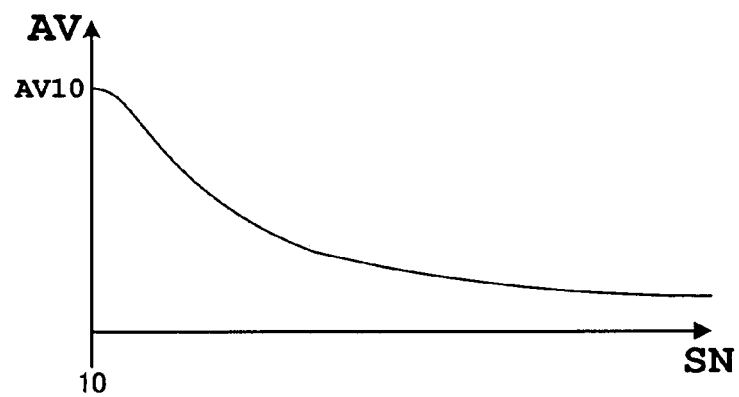
FIG. 3C is a chart showing the relation between an AF evaluation value and a lens position for capture areas 43 and 46.

FIGS. 3A, 3B and 3C showed the relation between the AF evaluation value and the lens position for each of the capture areas 41 to 49 when auto focus process is performed for the capture field as shown in FIG. 2B. The vertical axis shows the AF evaluation value (AV), and the horizontal axis shows the step number (SN).

Step numbers have been established by plotting in advance 10 lens positions from the wide-angle end to the telephoto end in the ascending order. The CPU 10 controls the lens actuator unit 3 so that the lens actuator unit 3 moves the focus lens unit 2a according to the order of the step number.

First, the CPU 10 outputs a control signal to make the lens actuator unit 3 move the focus lens unit 2a to the lens position of Step No. 1. Then, the CPU 10 controls the sensor driver 5 so that the sensor driver 5 reads out intensity of light of the capture field on which an image is formed by the entire capture area of the CMOS sensor 4 at that point.

Next, the CPU 10 controls the pre-process unit 7 and the image processing unit 8 so that they perform the above described processes to intensity of light that has been inputted and generate the image data. Next, the CPU 10 makes the AF evaluation Value calculating unit 9 calculate the AF evaluation value (AV1) for each of the capture areas 41 to 49, and stores it in the work area 131.

Next, the CPU 10 outputs a control signal to the lens actuator unit 3 for making the lens actuator unit 3 move the focus lens unit 2a to the lens position of Step No. 2, and makes the sensor driver 5, the pre-process unit 7, the image processing unit 8 and the AF evaluation value calculating unit 9 perform the similar processes.

Next, the CPU 10 compares the AF evaluation values (AV2) acquired as a result of the processes with the AF evaluation values (AV1) for the capture areas 41 to 49 at Step No. 1 that have already been stored in the work area 131.

As a result of comparison, if no AF evaluation values (AV2) at Step No. 2 are smaller than the AF evaluation values (AV1) described above, the CPU 10 makes the AF evaluation values (AV2) overwrite the AF evaluation values (AV1) which have already been stored in the work area 131.

Further, the CPU 10 outputs a control signal to the lens actuator unit 3 for making the lens actuator unit 3 move the focus lens unit 2a to the lens position of Step No. 3, and makes the sensor driver 5, the pre-process unit 7, the image processing unit 8 and the AF evaluation value calculating unit 9 perform the similar processes.

Next, the CPU 10 compares the AF evaluation values (AV3) acquired as a result of the processes with the AF evaluation values (AV2) for the capture areas 41 to 49 at Step No. 2 that have already been stored in the work area 131.

Then, the CPU 10 detects that the AF evaluation value (AV3) for the capture area 49 is smaller than the above-mentioned AF evaluation value (AV2) at Step No. 3 as shown in FIG. 3A.

In other words, the CPU 10 judges that some of the capture fields on which an image is formed by the capture area 49 are in focus when the focus lens unit 2a is at the lens position of Step No. 2.

(As shown in FIG. 2B, an image of a flower is formed as the object image to some of the capture fields of the capture area 49. This means that the image of the flower has been in focus at Step No. 2.)

As a result of this, among the AF evaluation values (AV3) at Step No. 3, the CPU 10 does not make the AF evaluation value (AV3) overwrite the AF evaluation value (AV2) for the capture area 49, but make the AF evaluation values (AV3) overwrite the AF evaluation values (AV2) for the capture areas 41 to 48.

In addition, the CPU 10 has already judged that the AF evaluation value (AV2) is the maximum evaluation value for the capture area 49. Accordingly, the CPU 10 controls the sensor driver 5 so that the sensor driver 5 will not perform reading out for the capture area 49 among the entire capture area of the CMOS sensor 4.

Further, the CPU 10 outputs a control signal to the lens actuator unit 3 for making the lens actuator unit 3 move the focus lens unit 2a to the lens position of Step No. 3, and makes the sensor driver 5, the pre-process unit 7, the image processing unit 8 and the AF evaluation value calculating unit 9 perform the similar processes as above for the capture areas 41 to 48.

Next, the CPU 10 compares the AF evaluation values (AV4) acquired as a result of the processes with the AF evaluation values (AV3) for the capture areas 41 to 48 at Step No. 3 that have already been stored in the work area 131. As a result of comparison, if no AF evaluation values (AV4) in Step No. 4 are smaller than the above-mentioned AF evaluation values (AV3), the CPU 10 makes the AF evaluation values (AV4) overwrite the AF evaluation values (AV3) for the capture areas 41 to 48 that have already been stored in the work area 131.

Further, the CPU 10 outputs a control signal to the lens actuator unit 3 for making the lens actuator unit 3 move the focus lens unit 2a to the lens position of Step No. 5, and makes the sensor driver 5, the pre-process unit 7, the image processing unit 8 and the AF evaluation value calculating unit 9 perform the similar processes. Then, the CPU 10 compares the AF evaluation values (AV5) acquired as a result of the processes with the AF evaluation values (AV4) for the capture areas 41 to 49 at Step No. 4 that have already been stored in the work area 131.

Then, the CPU 10 detects that the AF evaluation values (AV5) at Step No. 5 are smaller than the above-described AF evaluation values (AV4) for the capture areas 41, 42, 44, 45, 41 and 48 as shown in FIG. 3B.

In other words, the CPU 10 judges that objects whose image is formed by the capture areas 41, 42, 44, 45, 47 and 48 are in focus when the focus lens unit 2a is at the lens position of Step No. 5.

(As shown in FIG. 2B, an image of a face of a woman is formed as the object image in the capture areas 41, 42, 44, 45, 47 and 48 as shown in FIG. 2B. This means that the image of the face of a woman has been already in focus at Step No. 4.)

As a result of this, among the AF evaluation values (AV5) at Step No. 5, the CPU 10 does not make the AF evaluation value (AV5) overwrite the AF evaluation value (AV4) for the capture areas 41, 42, 44, 45, 47 and 48 as well as for the capture area 49, but make the AF evaluation values (AV5) overwrite the AF evaluation values (AV4) for the capture areas 43 and 46.

In addition, the CPU 10 has already judged that the AF evaluation values (AV4) are the maximum evaluation values for the capture areas 41, 42, 44, 45, 47 and 48 as well as for the capture area 49. Accordingly, the CPU 10 controls the sensor driver 5 so that the sensor driver 5 will not perform reading out for the capture areas 41, 42, 44, 45, 47 and 48 in addition to the capture area 49 among the entire capture area of the CMOS sensor 4.

Further, the CPU 10 also makes the lens actuator unit 3 move the focus lens unit 2a to the lens positions of Step Nos. 6, 7, 8, 9 and 10 and makes various units perform the similar processes. Then, the CPU 10 compares the AF evaluation values acquired as a result of the processes with the AF evaluation values for the capture areas 43 and 46 that have already been stored in the work area 131, and overwrites the AF evaluation values for the capture areas 43 to 46 that have already been stored in the work area 131.

At this time, the CPU 10 judges that, even at Step No. 10, that is, even if the focus lens unit 2a has been moved to the telephoto end position, some of the capture fields on which an image is formed by the capture areas 43 and 46 are not in focus and that focus is to be made on infinity.

(As shown in FIG. 2B, images of a mountain and a cloud are formed in a part of the capture fields of the capture areas 43 and 46.)

As a result of this, the CPU 10 makes the AF evaluation values (AV10) overwrite the AF evaluation values (AV9) for the capture areas 43 and 46, which results in the maximum values of the AF evaluation values being acquired for all of the capture areas 41 to 49. Accordingly, the CPU 10 stores the Step numbers at which the maximum values of the AF evaluation values have been stored for all of the capture areas 41 to 49.

Next, the CPU 10 transfers the information that has been stored in the work area 131 to the lens position storage area 121 and stores it there.

As a result of these processes, every time the lens position where the AF evaluation value becomes the maximum evaluation value is detected for the plurality of capture areas during the auto focus process, the CPU 10 prohibits reading out intensity of light corresponding to the capture area. Accordingly, reading speed of the CMOS sensor 4 can be increased. In addition, the moving speed of the focus lens unit 2a can be increased. Accordingly, time used for the auto focus process can be shortened.

FIG. 4 shows the state of the lens position storage area 121 of the memory 12 when the auto focus process is complete for the capture field shown in FIG. 2B and the information has been transferred to and stored in the work area 131.

The lens position storage area 121 has storage areas for storing each lens position (SN) corresponding to each of the capture areas 41 to 49. At Step No. 2, the AF evaluation value becomes the maximum evaluation value for the capture area 49. Accordingly, "Step No. 2" has been stored for the capture area 49.

Similarly, at Step No. 4, the AF evaluation values become the maximum evaluation values for the capture areas 41, 42, 44, 45, 47 and 48. Accordingly, "Step No. 4" has been stored for the capture areas 41, 42, 44, 45, 47 and 48, respectively.

Similarly, at Step No. 10, the AF evaluation values become the maximum evaluation values for the capture areas 43 and 46. Accordingly, "Step No. 10" has been stored for the capture areas 43 and 46, respectively.

A-2-2. During the Recording Process

During the recording process, the CPU 10 performs the processes of: sequentially moving the focus lens unit 2a to the lens position of each of the step numbers that have been stored in the lens position storage area 121; performing recording process at the position of at each step number; and composing the plurality of recorded image data for acquiring a single image data.

Hereinafter the process will be specifically described.

For example, start of the recording process is judged based on an operation signal corresponding to the length of the stroke given by depression of the shutter button by the user to the deepest position that has been sent from the key input section 11. When the CPU 10 detects start of the recording process, the CPU 10 reads out the lens position information and the capture area information stored in the lens position storage area 121 of the memory 12, stores them in a predetermined buffer memory, and performs the recording process based on the stored information.

Specifically, by sending a control signal to the lens actuator unit 3, the CPU 10 moves the focus lens unit 2a according to the lens position information stored in the buffer memory, that is, in the order of proximity to the object, that is, in the ascending order or the step number of the lens positions. Then the CPU 10 sequentially performs the recording process (exposure process and reading-out process from the CMOS sensor 4) at the lens position to which the focus lens 2a has been moved. During the reading-out process, intensity of light for only the capture area that have been stored in the buffer memory and that correspond to the lens position to which the focus lens 2a has been moved is read out from the CMOS sensor 4. For example, in the case where the information which has been stored in the lens position storage area 121 during the above-described auto focus process, the CPU 10 performs the process of moving the lens position of the focus lens unit 2a from Step No. 1 sequentially and reads out intensity of light of the capture field which is imaged by the CMOS sensor 4 at this time. In this case, when the lens of the focus lens unit 2a is positioned at Step No. 2, the CPU 10 reads out intensity of light imaged in the capture area 49 through exposure. When the lens is positioned at Step No. 4, the CPU 10 performs exposure and reads out intensity of light which forms an image in the capture areas 41, 42, 44, 45, 47 and 48, respectively. When the lens of the focus lens unit 2a is positioned at Step No. 10, the CPU 10 performs exposure and reads out intensity of light which forms an image in the capture areas 43 and 46, respectively.

That is, the CPU 10 does not read out intensity of light which forms an image in all of the capture fields at the lens positions corresponding to all step numbers. Instead, the CPU 10 reads out intensity of light which forms an image in the capture areas that are in focus and that have been stored during the auto focus process as described above. Therefore, the reading-out process can be completed quickly and a recording interval can be shortened. The data that has been read out is stored in the buffer memory.

Subsequently, the CPU 10 judges whether exposure and reading-out have been performed for the capture areas 41 to 49. When it judges that reading out has been performed, the CPU 10 makes the image composing unit 14 compound the image data for the capture areas 41 to 49 stored in the buffer memory for generating a single image data. Next, the CPU 10 compresses the generated image data and records it in the flash memory 15.

Note that during the composing process, a single image data is generated by composing the image data for the capture areas 41 to 49 based on the positions of the capture areas 41 to 49 of the CMOS sensor 4.

A-3. Operations of the Digital Camera 1

Operations performed by the digital camera 1 including the auto focus process and the recording process as described above will be described with reference to the flowchart shown in FIG. 5.

When the CPU 10 detects the operation of the mode selection key of the key input section 11 performed by the user and sets the mode to the recording mode, the CPU 10 outputs a control signal to the sensor driver 5 to drive the CMOS sensor 4, and performs the above-described processes to the capture fields that have been inputted to the pre-process unit 7 and the image processing unit 8, thereby generating the image data. Next, the CPU 10 performs a so-called through image display process of storing the image data consisting of brightness/color-difference signals generated by the image processing unit 8 in the buffer memory (DRAM 13), and converts the stored image data into RGB signals, thereby displaying it in the display unit 16 (Step S1).

Next, the CPU 10 judges whether the user has performed the halfway depression operation of the shutter button (Step S2). This judgment is made based on whether an operation signal corresponding to detection of the halfway depression operation of the shutter button has been sent from the key input section 11.

When judged at Step S2 that the halfway depression operation of the shutter button has not been detected, the CPU 10 returns to Step S1. When judged that the halfway depression operation of the shutter button has been detected, the CPU 10 starts the auto focus process (Step S3). As described above, in the auto focus process, when instruction to start the auto focus process is given based on detection of the halfway depression operation of the shutter button by the user, the CPU 10 sends a predetermined control signal to the lens actuator unit 3. Next, the lens actuator unit 3 that has received the control signal moves the lens position of the focus lens unit 2a from the telephoto end to the wide-angle end at a predetermined interval.

In addition, the predetermined control signal is also sent to the sensor driver 5. Every time the focus lens unit 2a has been moved to a preset lens position, the sensor driver 5 which has received the control signal outputs intensity of light which forms an image in the entire capture area of the CMOS sensor 4 to the pre-process unit 7.

Meanwhile, the pre-process unit 7 and the image processing unit 8 perform the above-described processes on the capture field that has been inputted, thereby generating the image data. At this time, the image processing unit 8 divides the generated image data based on the positions of the plurality of capture areas 41 to 49 that have been divided as described above, and sequentially sends the divided image data to the AF evaluation value calculating unit 9.

The AF evaluation value calculating unit 9 reads out the image data of the capture areas 41 to 49 at individual lens positions, calculates the AF evaluation values of the capture areas 41 to 49 based on these image data, and outputs the AF evaluation values to the CPU 10.

Next, the CPU 10 judges whether the lens positions of the focus lens unit 2a where the AF evaluation value becomes the maximum evaluation value have been detected for all of the capture areas 41 to 49 based on the calculated AF evaluation values of the capture areas 41 to 49 (Step S4).

When judged at Step S4 that the lens positions where the AF evaluation values become the maximum evaluation values have not been detected for the capture areas 41 to 49, the CPU 10 remains at Step S4 until the lens positions are detected. When judged that all of the lens positions where the AF evaluation values become the maximum evaluation values have been detected for the capture areas 41 to 49, the CPU 10 finally stores the lens positions where the AF evaluation values become the maximum evaluation values and the capture areas in the lens position storage area 121 of the memory 12 (Step S5).

The focus lens unit 2a has been moved from the telephoto end to the wide-angle end during the auto focus process. Accordingly, the lens positions where the AF evaluation values become the maximum evaluation values are also detected in the ascending order of the step number.

For example, when the CMOS sensor 4 forms an image as shown in FIG. 2B, the lens position where the AF evaluation value becomes the maximum evaluation value will be detected in the order Step No. 2, Step No. 4, and Step No. 10. In this case, the lens position information and the capture area information are stored as shown in FIG. 4.

Next, the CPU 10 prohibits reading out of the capture field from the CMOS sensor 4 for the capture area where the AF evaluation value becomes the maximum evaluation value (Step S6). At this time, since a frame rate (a reading time interval from the CMOS sensor 4) increases depending on the number of capture areas for which the reading out is prohibited, the moving speed of the focus lens unit 2a will also increase in accordance with the increase of the frame rate.

For example, in the case where the stored information shown in FIG. 4 is generated for the capture field in FIG. 2B, Step No. 2 is the lens position where the AF evaluation value becomes the maximum evaluation value for the capture area 49. Accordingly, the capture field will not subsequently be read out from the CMOS sensor 4 for the capture area 49. In addition, Step No. 4 is the lens position where the AF evaluation value becomes the maximum evaluation value for the capture areas 41, 42, 44, 45, 47 and 48. Accordingly, the capture field will not subsequently be read out from the CMOS sensor 4 for the capture areas 41, 42, 44, 45, 47, 48 and 49. Accordingly, every time the lens position is detected for each of the plurality of capture areas, the capture areas for which the capture field is to be read out decreases. As a result of this, a frame rate can be increased. In accordance with the increase, the moving speed of the focus lens unit 2a can be increased, and the time used for the auto focus process can be reduced.

Next, the CPU 10 judges whether there is any capture area for which the lens position where the AF evaluation value becomes the maximum evaluation value has not been detected (Step S7).

When judged at Step S7 that there is a capture area for which the lens position where the AF evaluation value becomes the maximum evaluation value has not been detected, the CPU returns to Step S4. When judged that the lens positions where the AF evaluation value becomes the maximum evaluation value have been detected for all capture areas, the CPU 10 terminates the auto focus process (Step S8).

Next, the CPU 10 judges whether instruction to record has been given (Step S9). The judgment is made based on, for example, whether an operation signal corresponding to the length of the stroke given by depression of the shutter button by the user to the deepest position has been sent from the key input section 11.

When judged at Step 9 that instruction to record has not been detected, the CPU 10 remains at Step 9 until instruction to record is detected. On the other hand, when judged that instruction to record has been given, the CPU 10 proceeds to Step S10.

Having proceeded to Step S10, the CPU 10 moves the focus lens unit 2a to the lens position with the smallest step number among the lens positions stored in the lens position storage area 121 of the memory 12. For example, in the case where the information as shown in FIG. 4 is stored, the CPU 10 moves the focus lens unit 2a to the lens position of Step No. 2.

Next, the CPU 10 controls the sensor driver 5 so that the CMOS sensor 4 performs the exposure process. The CPU 10 also controls the lens actuator unit 3 so as to perform the recording process of reading out intensity of light from the CMOS sensor 4 at the lens position stored in the above-mentioned auto focus process for the capture area corresponding to the lens position, and of generating the image data and recording it (Step S11).

For example, based on the information shown in FIG. 4, the capture area corresponding to the lens position of Step No. 2 is the capture area 49. Accordingly, intensity of light which forms an image in the capture area 49 is read out from the CMOS sensor 4. The image data corresponding to intensity of light which has been read out is stored in the buffer memory.

Next, the CPU 10 judges whether intensity of light has been read out for all of the capture areas (Step S12).

When judged at Step S12 that intensity of light has not been read out for all of the capture areas, the CPU 10 sequentially moves the focus lens unit 2a to the corresponding lens position in the ascending order of the step number (Step S13), and returns to Step S1.

On the other hand, when judged at Step S12 that intensity of light has been read out for all of the capture areas, the CPU 10 makes the image composing unit 14 composite image data of the entire capture area that has been read out and generated, thereby generating a single image data, compresses the generated still image data, and records it in the flash memory 15 (Step S14).

In the first embodiment, in the case where instruction to record is given without the halfway depression operation of the shutter button having been detected, the CPU 10 performs the operation of Step S10 and thereafter after having performed the operations of Step S3 to Step S8.

A-4. Effects

As described above, according to the first embodiment, when the halfway depression operation of the shutter button is detected, the lens position which is in focus for each capture area is detected and stored. On the other hand, when instruction to record is detected, intensity of light is sequentially read out at the stored lens position from the capture area associated with the lens position and the image data is generated. Accordingly, it is possible to acquire image data which is in focus on all objects that have been imaged by the CMOS sensor 4.

In addition, since a need for performing the auto focus process is eliminated during the recording process, an interval between the reading-out processes during recording can be shortened. In other words, since a single composite image data can be acquired in a short period of time, a beautiful composite image data without camera shake can be acquired.

In addition, during the recording process, intensity of light is read out from the CMOS sensor 4 only for the capture area which is in focus for generating the image data. Therefore, the recording process can be performed in a short period of time.

In addition, during the auto focus process, since reading out from the CMOS sensor 4 is prohibited for the capture area which has been stored being associated with the lens position, a frame rate can be increased. In accordance with the increase, the moving speed of the focus lens unit 2a can be increased, and the time used for the auto focus process can be reduced.

B. Second Embodiment

Next, the second embodiment will be described.

In the first embodiment, the auto focus process and the recording process are performed separately. In the second embodiment, however, every time the lens position is in focus is detected, the recording process is performed at the time point.

B-1. Operation of the Digital Camera 1

The second embodiment also actualizes an image capturing apparatus of the present invention by using a digital camera 1 with a similar configuration of that shown in FIG. 1.

Operations performed by the digital camera 1 according to the second embodiment will be described with reference to the flowchart in FIG. 6.

When the CPU 10 detects the operation of the mode selection key of the key input section 11 performed by the user and sets the mode to the recording mode, the CPU 10 outputs a control signal to the sensor driver 5 to drive the CMOS sensor 4, and performs the above-described processes to the capture fields that have been inputted to the pre-process unit 7 and the image processing unit 8, thereby generating the image data. Next, the CPU 10 performs a so-called through image display process of storing the image data consisting of brightness/color-difference signals generated by the image processing unit 8 in the buffer memory (DRAM 13), and converts the stored image data into RGB signals, thereby displaying it in the display unit 16 (Step S1).

Next, the CPU 10 judges whether instruction to record has been detected (Step S52). In this case, it is assumed that instruction to record is detected in the case where the capture field shown in FIG. 2B is imaged.

When judged at Step S52 that instruction to record has not been detected, the CPU 10 returns to Step S51. On the other hand, when judged that instruction to record has been detected, the CPU 10 starts the auto focus process (Step S53).

Next, the CPU 10 judges whether the lens position where the AF evaluation value becomes the maximum evaluation value has been detected for the capture areas 41 to 49 (Step S54).

When judged at Step S54 that the lens position where the AF evaluation value becomes the maximum evaluation value has been detected for the capture area, the CPU 10 remains at Step S54 until the lens position where the AF evaluation value becomes the maximum evaluation value is detected for the capture area. On the other hand, when judged that the lens position where the AF evaluation value becomes the maximum evaluation value is detected for the capture area, the CPU moves the focus lens unit 2a to the lens position where the AF evaluation value becomes the maximum evaluation value (Step S55).

Next, the CPU 10 controls the sensor driver 5 so as to expose light to the CMOS sensor 4, reads out intensity of light only from the capture area where the AF evaluation value becomes the maximum evaluation value is detected among the capture areas 41 to 49, and stores the image data acquired based on the reading out in the buffer memory (Step S56).

Next, the CPU 10 prohibits reading out of the capture field from the CMOS sensor 4 for the capture area where the AF evaluation value becomes the maximum evaluation value (Step S57). At this time, since a frame rate (a reading time interval from the CMOS sensor 4) increases depending on the number of capture areas for which the reading out is prohibited, the moving speed of the focus lens unit 2a will also increase in accordance with the increase of the frame rate.

As described above, the focus lens unit 2a is moved to the corresponding lens position while sequentially increasing the Step Number. Every time the lens position where the AF evaluation value becomes the maximum evaluation value is detected, the reading out process and recording of the image data as described above are performed only for the capture area corresponding to the lens position. Next, the CPU 10 judges whether the lens positions where the AF evaluation value becomes the maximum evaluation value have been detected for all of the capture areas (Step S58). When judged NO, the CPU 10 returns to Step S54.

Operations of Step S53 to Step S58 will be specifically described with reference to FIGS. 3A and 3B.

First, the focus lens unit 2a is moved to the lens position of Step No. 1, where intensity of light is picked out and read out for the entire capture area for generating the image data, and the AF evaluation values are calculated for the capture areas 41 to 49.

Next, the focus lens unit 2a is moved to the lens position of Step No. 2, intensity of light is picked out and read out for the entire capture area for generating the image data, and the AF evaluation values are calculated for the capture areas 41 to 49.

Next, the focus lens unit 2a is moved to the lens position of Step No. 3, where the image data for the entire capture area is picked out for generating the image data, and the AF evaluation values are calculated for the capture areas 41 to 49. At this time, however, the AF evaluation value has already become the maximum evaluation value at Step No. 2 for the capture area 49 (YES at Step S54). Accordingly, the focus lens unit 2a is moved to the lens position where the AF evaluation value has become the maximum evaluation value, that is, the lens position of Step No. 2 (Step S55).

Next, exposure is performed at the lens position, and intensity of light is read out from the CMOS sensor 4 only for the capture area 49 for generating image data. Then, the image data is stored in the buffer memory (Step S56).

Next, reading out from the CMOS sensor 4 is prohibited for the capture area 49 (Step S57).

At this time, the lens positions where the AF evaluation value becomes the maximum evaluation value have not been detected for all of the capture areas (NO at Step S58). Accordingly, the focus lens unit 2a is moved to the lens position corresponding to Step No. 4, where the image data in the capture areas other than the capture area 49 is picked out and read out from the CMOS sensor 4 for generating image data, and the AF evaluation value is calculated.

Next, the focus lens unit 2a is moved to the lens position of Step No. 5, where the image data in the capture areas (i.e., the capture areas other than the capture area 49) is picked out and read out from the CMOS sensor 4 for generating image data, and the AF evaluation value is calculated for each capture area. At this time, the AF evaluation values have already become the maximum evaluation values at Step No. 4 for the capture areas 41, 42, 44, 45, 47 and 48 (YES at Step S54), the focus lens unit 2a is moved again to the lens position where the AF evaluation value becomes the maximum evaluation value, that is, the lens position of Step No. 4 (Step S55).

Next, exposure is performed and intensity of light is read out for the capture areas 41, 42, 44, 45, 47 and 48 for generating image data. Then, the image data is stored in the buffer memory (Step S56). Next, reading out from the CMOS sensor 4 is prohibited for the capture areas 41, 42, 44, 45, 47 and 48 (Step S57).

At this time, the lens positions where the AF evaluation value becomes the maximum evaluation value have not been detected for all of the capture areas (NO at Step S58). Accordingly, the focus lens unit 2a is moved to the lens position of Step No. 6, where intensity of light in the capture areas other than the capture areas 41, 42, 45, 47, 48 and 49, is thinned out and read out for generating image data, and the AF evaluation value is calculated. The operations as described above are performed until the lens positions where the AF evaluation value becomes the maximum evaluation value are detected for all of the capture areas.

Figure 6:
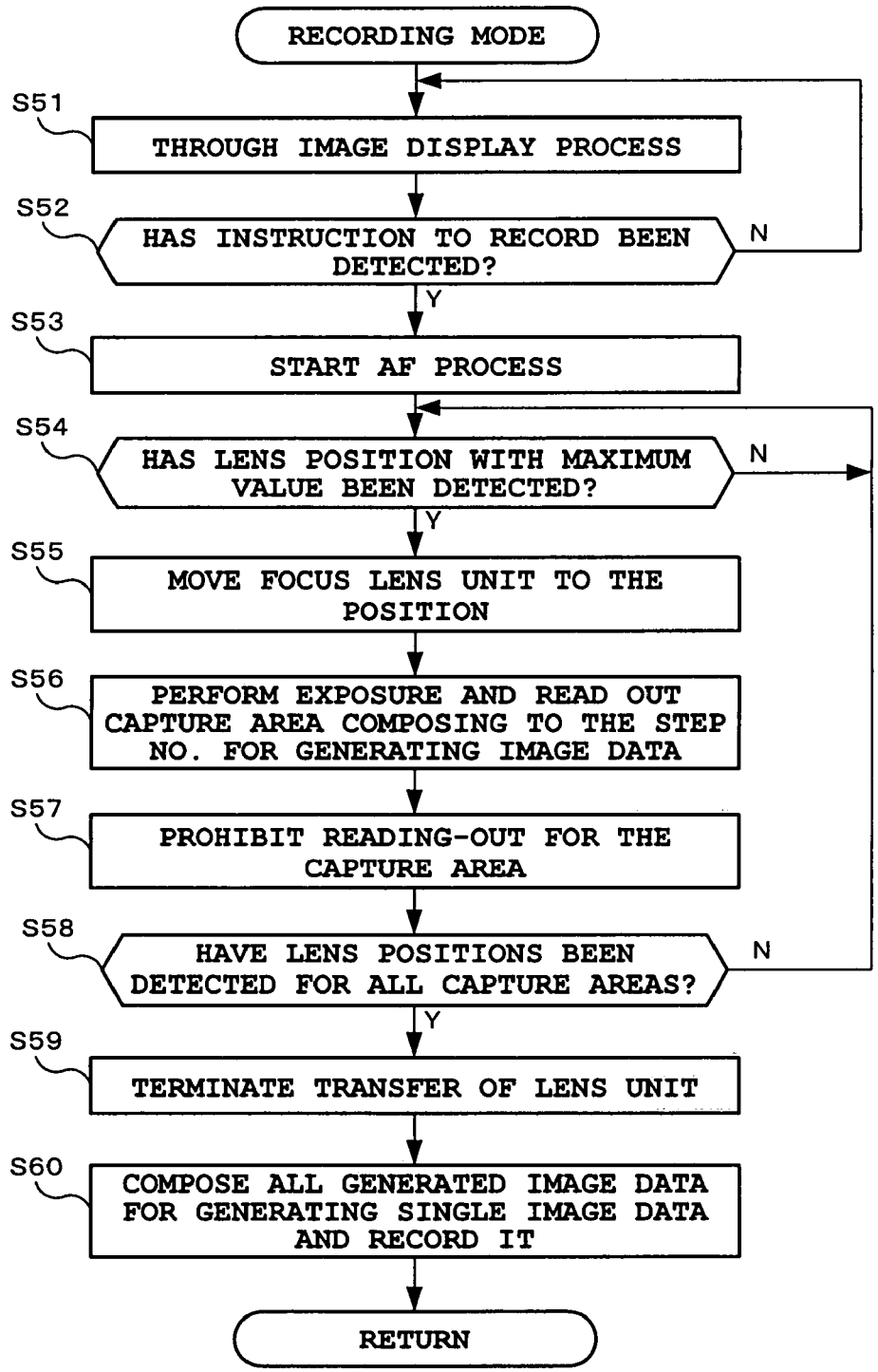
FIG. 6 is a flowchart of an operation in the second embodiment.

Referring back to the flowchart in FIG. 6, when judged at Step S58 that the lens position where the AF evaluation value becomes the maximum evaluation value has been detected for all of the capture areas, the CPU 10 terminates moving of the lens (Step S59). Then the CPU 10 makes the image composing unit 14 compound the image data of all of the capture areas stored in the buffer memory for generating a single image data, compresses the generated image data, and records it in the flash memory 15 (Step S60).

B-2. Effects

As described above, in the second embodiment, intensity of light from the CMOS sensor 4 is picked out and read out in the auto focus process, and reading out from the CMOS sensor 4 is prohibited for the capture area for which the lens position where the AF evaluation value becomes the maximum evaluation value is detected. Accordingly, a frame rate can be increased.

In addition, as a result of this, the moving speed of the focus lens unit 2a can be increased, and whereby a composite image without camera shake can be acquired.

In addition, in the recording process, intensity of light is read out only from the capture area corresponding to the lens position where the AF evaluation value becomes the maximum evaluation value for generating image data. Accordingly, the time required for generating image data can be shortened, and thus the recording interval can be reduced.

C. Variation Examples

In the first and second embodiments, the AF evaluation values are calculated for all of the plurality of capture areas for determining the lens position. Alternatively, the AF evaluation value may be calculated for only some of the capture areas for determining the lens position.

In addition, in the first and second embodiments, the capture area is divided into 9 capture areas with equal length. Alternatively, a known image recognition method may be used to recognize a plurality of objects based on the capture field and to detect the lens position where the AF evaluation value becomes the maximum evaluation value for each recognized object.

Further, in the first and the second embodiments, a contrast auto focus method is employed where the focus lens unit 2a is moved to the position where the AF evaluation value becomes the maximum evaluation value. Alternatively, the method to determine the lens position of the focus lens unit 2a is not limited to this.

For example, some AF methods employ a recording parameter other than the AF evaluation value for determining the lens position of the focus lens unit 2a. In this AF method, the lens position of the focus lens unit 2a may be determined based on the best evaluation value which has been determined moving this recording parameter also into consideration.

In addition, the CMOS sensor 4 is used to describe an image capturing element in the first and second embodiments. Alternatively, other image pickup sensors such as CCD sensors may be used.

In addition, other auto focus methods such as the phase difference AF may be used as the method to determine the lens position which is in focus.

Figure 5:
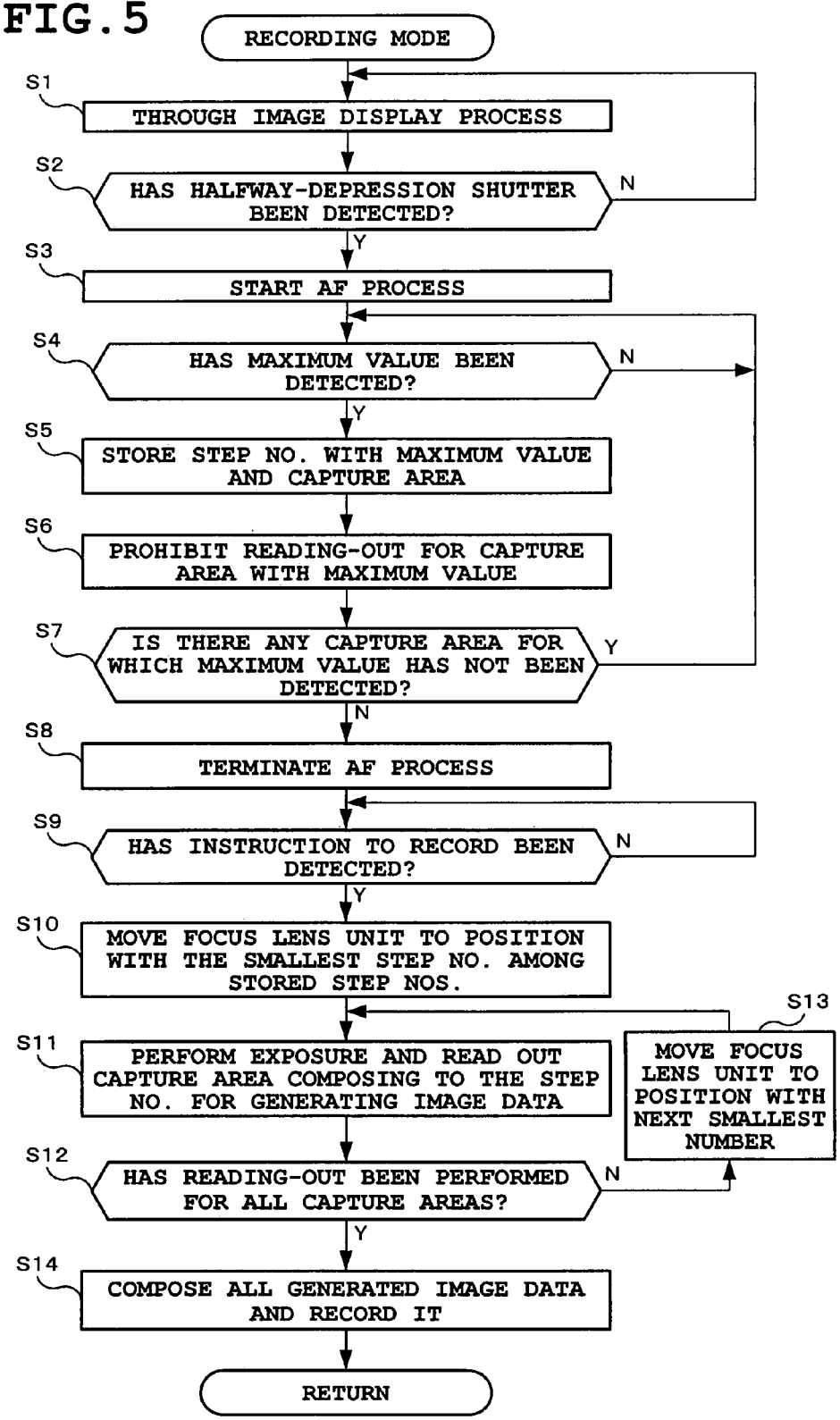
FIG. 5 is a flowchart of an operation in the first embodiment.

In addition, in the first and second embodiments, intensity of light is read out only for some capture areas (Step S11 in FIG. 5, and Step S56 in FIG. 6). Alternatively, intensity of light may be read out by the CMOS sensor for all capture areas on which an image is formed for generating image data, and the image data associated with the capture area corresponding to the lens position which is in focus may be compounded for acquiring the composite data.

Still further, the digital camera 1 in the above-described embodiments is not limited to the embodiments as described above. It may be a cell phone with camera, a PDA with camera, a PC with camera, an IC recorder with camera or a digital video camera, or any apparatus with an auto focus function and recording function.

Furthermore, although the processing program of the digital camera which is a preferred embodiment of the present invention is stored in the memory (for example, ROM, etc.) of the digital camera, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

This application is based upon and claims the benefit of priority from the prior Japanese Patent Application No. 2006-035079 filed 13 Feb. 2005, the entire contents of which is incorporated herein by reference.

What is claimed is:

1. An image capturing apparatus comprising:
    an image capturing unit;
    a lens;
    a moving unit which moves the lens;
    a focusing unit which divides a capture field of the image capturing unit into a plurality of areas, controls the moving unit so that the moving unit moves the lens, and focuses on an object included in each of the plurality of areas;
    a control unit which performs control so as to associate the plurality of lens positions of the lens focused on by the focusing unit with the plurality of areas including the objects which are focused on at the plurality of lens positions;
    a first image data acquisition unit which controls the moving unit so that the moving unit moves the lens to the plurality of lens positions that have been associated by the control unit, and acquires image data in the plurality of areas that have been associated with the lens positions of the lens moved by the moving unit, and
    a generation unit which composes a plurality of image data acquired by the image data acquisition unit and generates image data corresponding to the capture field.

2. The image capturing apparatus according to claim 1, wherein the moving unit moves the lens in one direction at a predetermined interval, and
    the focusing unit focuses on an object included in each of the plurality of areas at the predetermined interval.

3. The image capturing apparatus according to claim 1, wherein the focusing unit focuses on an object included in an area other than an area, if any, in which a lens position has already been associated by the control unit.

4. The image capturing apparatus according to claim 1, further comprising:
    a judgment unit which judges whether the control unit has associated the lens position with the area for all of the plurality of areas,
    wherein the first image data acquisition unit acquires image data in the case where the judgment unit judges that the lens positions have been associated with the areas including the object for the all of the plurality of areas.

5. The image capturing apparatus according to claim 4, further comprising:
    a storage unit which stores the lens position and the area so as to be associated with each other for all of the plurality of areas,
    wherein the judgment unit makes judgment based on whether the storage unit has stored the lens position and the area for all of the plurality of areas.

6. The image capturing apparatus according to claim 1, wherein the plurality of areas are formed by identifiably dividing the capture field of the image capturing unit.

7. The image capturing apparatus of claim 1 further comprising:
a second image data acquisition unit which acquires image data for each of the plurality of areas; and
a contrast value acquisition unit which acquires a contrast value from a high-frequency component of the image data acquired by the second image data acquisition unit,
wherein the focusing unit focuses on an object based on the contrast value acquired by the contrast value acquisition unit.

8. The image capturing apparatus according to claim 1, further comprising:
an operation unit; and an operation state detection unit which detects two operation states for the operation unit,
wherein the focusing unit operates if the operation state detection unit detects one of the operation states, and the first image data acquisition unit operates if the operation state detection unit detects the other operation state.

9. The image capturing apparatus according to claim 1, wherein the first image data acquisition unit acquires only the image data in the area which has been associated with the lens position of the lens moved by the moving unit.

10. An image composing method of an electronic apparatus including an image capturing unit, a lens and a moving unit which moves the lens; the method comprising:
a focusing step for dividing a capture field of the image capturing unit into a plurality of areas, controlling the moving unit so that the moving unit moves the lens, and focusing on an object included in each of the plurality of areas;
a control step for performing control so as to associate the plurality of lens positions of the lens with the plurality of areas including the objects which are focused on at the plurality of lens positions;
an image data acquisition step for controlling the moving unit so that the moving unit moves the lens to the plurality of lens positions that have been associated by the control step, and acquiring image data in the plurality of areas that have been associated with the lens positions of the lens moved by the moving unit, and
a generation step for composing a plurality of image data acquired by the image data acquisition step and generating image data corresponding to the capture field.

11. The image composing method according to claim 10, wherein the focusing step focuses on an object included in an area other than an area, if any, in which a lens position has already been associated by the control step.

12. The image composing method according to claim 10, further comprising:
a judgment step for judging whether the control step has associated the lens position with the area including the object which is focused on at the lens position for all of the plurality of areas,
wherein the first image data acquisition step acquires image data in the case where the judgment step judges that the lens positions have been associated with the areas for all of the plurality of areas.

13. The image composing method according to claim 12, further comprising:
a storage step for storing the lens position and the area so as to be associated with each other for all of the plurality of areas in a memory,
wherein the judgment step makes judgment based on whether the storage step has stored the lens position and the area for all of the plurality of areas.

14. The image composing method according to claim 10, further comprising an operation state detection step for detecting two operation states for an operation unit provided in the electronic apparatus;
wherein the focusing step operates if the operation state detection step detects one of the operation states, and the first image data acquisition step operates if the operation state detection step detects the other operation state.

15. A computer-readable storing medium having an image capturing program stored thereon that is executable by a computer of an electronic apparatus that includes an image capturing unit, and moving unit which moves the lens, the image capturing program being executable by the computer to control the electronic apparatus to perform a process comprising: a focusing step for dividing a capture field of the image capturing unit into a plurality of areas, controlling the moving unit so that the moving unit moves the lens, and focusing on an object included in each of the plurality of areas; a control step for performing control so as to associate the plurality of lens positions of the lens with the plurality of areas including the objects which re focused on at the plurality of lens positions; an image data acquisition step for controlling the moving unit so that the moving unit moves the lens to the plurality of lens positions that have been associated by the control step, and acquiring image data in the plurality of areas that have been associated with the lens positions of the lens moved by the moving unit, and a generation step for composing a plurality of image data acquired by the image data acquisition step and generating image data corresponding to the capture field.

16. The computer program product according to claim 15, wherein the focusing step focuses on an object included in an area other than an area, if any, in which a lens position has already been associated by the control step.

17. The computer program product according to claim 15, executed by a computer, further comprising the step of: a Judgment step for judging whether the control Step has associated the lens position with the area including the object which is focused on at the lens position for all of the plurality of areas, where in the first image data acquisition step acquires image data in the case where the judgment step judges that the lens positions have been associated with the areas for all of the plurality of areas.

18. The computer-readable storage medium according to claim 17, wherein the process further comprises: a storage step for storing the lens position and the area so as to be associated with each other for all of the plurality of areas in a memory, wherein the judgment step makes Judgment based on Whether the storage step has stored the lens position and the area for all of the plurality of areas.

19. The computer-readable storage medium according to claim 15, executed by a computer, further comprising the step of wherein the process further comprises an operation state detection step for detecting two operation states for an operation unit provided in the computer;
where in the focusing step operates if the operation state detection step detects one of the operation states, and the first image data acquisition step operates if the operation state detection step detects the other operation state.

20. An image capturing apparatus comprising:
image capturing means;
lens;
moving means for moving the lens;
focusing means for dividing a capture field of the image capturing means into a plurality of areas, controlling the moving means so that the moving means moves the lens means, and focusing on an object included in each of the plurality of areas;

control means for performing control so as to associate the plurality of lens positions of the lens focused on by the focusing means with the plurality of areas including the objects which are focused on at the plurality of lens positions;

first image data acquisition means which controls the moving means so that the moving means moves the lens to the plurality of lens positions that have been associated by the control means, and acquires image data in the plurality of areas that have been associated with the lens positions of the lens moved by the moving means, and generating means for composing a plurality of image data acquired by the image data acquisition unit and generating image data corresponding to the capture field.

* * * * *